US010752508B2

(12) United States Patent
Fournier et al.

(10) Patent No.: US 10,752,508 B2
(45) Date of Patent: Aug. 25, 2020

(54) METHOD FOR THE PRODUCTION OF AMORPHOUS SILICA WITH CONTROLLED SPECIFIC SURFACE AREA FROM MAGNESIUM SILICATE ORE

(71) Applicant: ALLIANCE MAGNÉSIUM INC., Brossard (CA)

(72) Inventors: Joël Fournier, Carignan (CA); Laury Gauthier, St-Apollinaire (CA)

(73) Assignee: ALLIANCE MAGNÉSIUM INC., Brossard, QC (CA)

( * ) Notice: Subject to any disclaimer, the term of this patent is extended or adjusted under 35 U.S.C. 154(b) by 0 days.

(21) Appl. No.: 15/571,290

(22) PCT Filed: May 5, 2016

(86) PCT No.: PCT/CA2016/050516
§ 371 (c)(1),
(2) Date: Nov. 2, 2017

(87) PCT Pub. No.: WO2016/176772
PCT Pub. Date: Nov. 10, 2016

(65) Prior Publication Data
US 2018/0111835 A1 Apr. 26, 2018

Related U.S. Application Data

(60) Provisional application No. 62/157,552, filed on May 6, 2015.

(51) Int. Cl.
*C01B 33/12* (2006.01)
*C01F 5/00* (2006.01)
(Continued)

(52) U.S. Cl.
CPC .......... *C01B 33/128* (2013.01); *C01B 33/124* (2013.01); *C01F 5/00* (2013.01);
(Continued)

(58) Field of Classification Search
CPC ....... C01B 33/128; C01B 33/124; C01F 5/00; C22B 3/10; C22B 3/22
See application file for complete search history.

(56) References Cited

U.S. PATENT DOCUMENTS 2,839,475 A * 6/1958 Innes ................. B01J 21/12
502/238
3,677,938 A * 7/1972 Le Page ............. B01J 20/10
210/656

FOREIGN PATENT DOCUMENTS

CA       1184740 A  *  4/1985  ............ C01B 33/12
GB       1488339 A     10/1977
(Continued)

OTHER PUBLICATIONS

Shen et al(Effects of calcination parameters on the silica phase of original and leached rice husk ash, Mater Lett 65 (2011) 1179-1183). (Year: 2011).*
(Continued)

*Primary Examiner* — Patricia L. Hailey
*Assistant Examiner* — Michael Forrest
(74) *Attorney, Agent, or Firm* — Norton Rose Fulbright

(57) ABSTRACT

It is provided a process of producing amorphous silica from a raw material, such as serpentine, containing silica comprising the steps of mixing the raw material with a hydrochloric acid solution; leaching the raw material obtaining a slurry comprising a liquid fraction and a solid fraction containing silica and minerals; separating the liquid fraction and the solid fraction; removing the minerals from the solid fraction by magnetic separation producing a purified solid silica; drying the purified solid silica; and heating the purified solid silica to remove hydroxyl groups from the silica surface and reducing specific surface area of the resulting amorphous silica.

12 Claims, 3 Drawing Sheets

(51) Int. Cl.
C22B 3/10 (2006.01)
C22B 3/22 (2006.01)

(52) U.S. Cl.
CPC ............... C22B 3/10 (2013.01); C22B 3/22 (2013.01); C01P 2002/02 (2013.01)

(56) References Cited

FOREIGN PATENT DOCUMENTS

| GB | 2078703 | 1/1982 |
| WO | 9507235 A1 | 3/1995 |
| WO | 2004048264 A2 | 6/2004 |
| WO | 2014029031 | 2/2014 |

OTHER PUBLICATIONS

Piertrikova et al. "Preparation of SiO2 Powder through leaching of Serpentine", Metalurgija, 43 (2004), 4, 299-304.
V.V. Velinski: "Production of extra pure silica from serpentinites", Journal of Mining Science, vol. 38, No. 4, Jan. 1, 20002 (Jan. 1, 2002), pp. 402-404, XP055509908, Dordrecht ISSN: 1062-7391, DOI : 10.1023/A:1023324206554.

\* cited by examiner

METHOD FOR THE PRODUCTION OF AMORPHOUS SILICA WITH CONTROLLED SPECIFIC SURFACE AREA FROM MAGNESIUM SILICATE ORE

CROSS-REFERENCE TO RELATED APPLICATIONS

This application is a U.S. National Phase of International Application No. PCT/CA2016/050516, filed on May 5, 2016 and claiming priority from U.S. provisional patent application 62/157,552 filed on May 6, 2015, and this application claims priority to and the benefit of the above-identified applications, each of which are incorporated by reference herewith in their entirety.

TECHNICAL FIELD

It is provided a process to make amorphous silica of a desirable specific surface area from natural resources readily available, producing a silica with hydrophilic or hydrophobic surface properties

BACKGROUND

Amorphous silica is mainly produced synthetically, particularly through a reaction between a sodium silicate solution and a mineral acid. Both react to produce silica in a precipitated form which is then dried and milled to the desired size. Sodium silicate ($Na_2SiO_3$) is normally produced at elevated temperature (around 1200 to 1400° C.) by reacting crystalline silica ($SiO_2$) with sodium carbonate ($Na_2CO_3$). This process is expensive because of the large quantity of energy required and the cost of the reagents.

As an alternative raw material, magnesium silicate ore can be used to produce amorphous silica. For example, serpentine contains approximately 40 percent $SiO_2$. Serpentine is a family of mineral silicates. The three most important serpentine polymorphs are lizardite, antigorite and chrysotile which is a form of asbestos. These all have essentially the same chemistry, but they differ in their structures.

Large quantities of serpentine are available in North America from the asbestos industry. Over the years, mountains of tailings, mainly lizardite $Mg_3Si_2O_5(OH)_4$, have accumulated. These tailings can also contain other minor components such as $Mg(OH)_2$, $Ni_8Fe_3$, $Fe_3O_4$, etc. Such deposits represent an excellent, natural resource, easily available.

Amorphous silica is mainly used as an additive in a number of industrial applications, namely in the production of concretes, tires, paints, plastics, etc. Many of these applications are sensitive to silica's specific surface area, hydrophilic or hydrophobic properties, purity and particle size. Amorphous materials are characterized by atoms settled in irregular patterns (relative position and distance).

Activated silica can be produced by leaching magnesium silicate ore in hydrochloric acid media as described in GB 2 078 703. A material with a specific surface area of approximately 220 $m^2/g$ was achieved. During this hydrometallurgical process, the soluble portion passes in solution leaving behind the $SiO_2$ phase along with other insoluble impurities. After this extraction step, silica is separated from the solution and washed. An additional cleaning step is necessary and it involves the separation of unreacted material by a physical method such as a shaker table. However, the level of impurities remains relatively high. This material is then dried, before or after a grinding operation, under conditions favoring the removal of moisture, whereas the chemically bound water is retained. The inventor observed a reduction of the material's specific surface area when the operations of separation, washing, and processing are not carried out immediately after the extraction, followed by a rapid drying step. No cause is identified yet to explain this and to determine which steps contribute to modify the surface.

To generate the properties of amorphous silica for its various industrial applications, production methods have to be flexible under controlled conditions. In addition, there are environmental benefits and economic advantages to produce this specialty silica from natural raw material. It is desirable, therefore, to elaborate an optimum method for the production of amorphous silica.

SUMMARY

In accordance with the present description, there is now provided a process producing amorphous silica from a raw material containing silica comprising the steps of mixing the raw material with a hydrochloric acid solution; leaching the raw material obtaining a slurry comprising a liquid fraction and a solid fraction containing amorphous silica and minerals; separating the liquid fraction from the solid fraction; removing the minerals from the solid fraction by magnetic separation producing a purified solid silica; drying the purified solid silica; and heating the purified solid silica to remove hydroxyl groups from the silica surface and reducing specific surface area of the resulting purified amorphous silica.

In an embodiment, the raw material is serpentine

In another embodiment, the grain size of serpentine comprises a diameter of less than 550 μm.

In a further embodiment, the grain size of serpentine comprises a diameter between 45 to 425 μm.

In a further embodiment, the raw material is dissolved with hydrochloric acid solution at a concentration in the range of 4 to 7 moles per liter.

In a further embodiment, untreated water is used to further dilute the hydrochloric acid solution.

In an embodiment, the raw material is leached at a temperature of 80 to 105° C.

In an embodiment, the solid fraction is further washed with hot water to remove impregnated magnesium-rich solution.

In a further embodiment, the liquid fraction is further treated to recover magnesium and recuperate the hydrochloric acid.

In a further embodiment, the process described herein further comprises washing the solid silica with water free of impurities.

In a further embodiment, the process described herein further comprises the step of grinding the solid silica to reduce the particle size distribution before drying.

In an embodiment, the solid silica is dried at a temperature of 60 to 200° C.

In another embodiment, the solid silica is heated at a temperature of 200 to 800° C.

In a further embodiment, the process described herein further comprises the step of doping the solid silica by impregnation with alkali ion before drying.

In a further embodiment, the alkali ion is at least one of lithium ($Li^+$), sodium ($Na^+$), potassium ($K^+$) and cesium ($Cs^+$) as a decreasing surface specific agent.

In another embodiment, the alkali ion is at least one of a carbonate ($CO_3^{2-}$), a chloride ($Cl^-$) a nitrate ($NO_3^-$) and a sulphate ($SO_4^{2-}$) form.

In a further embodiment, the solid silica is doped with one or a mixture of two compounds in the list, such $Li_2CO_3$, $LiCl$, $LiNO_3$, $Li_2SO_4$, $Na_2CO_3$, $NaCl$, $NaNO_3$, $Na_2SO_4$, $K_2O_3$, $KCl$, $KNO_3$, $K_2SO_4$, $Cs_2CO_3$, $CsCl$, $Cs_2NO_3$ and $Cs_2SO_4$.

In a further embodiment, the solid silica is doped with sodium aluminate.

In a further embodiment, the doping alkali ion is added in aqueous or solid state.

In an embodiment, the doping alkali ion is added in an amount of 0.01 to 0.50 millimoles per gram of silica.

In a further embodiment, the doped silica is aged at a temperature of 50 to 100° C.

In an embodiment, the process described herein further comprises the step of leaching the solid silica before drying.

In a further embodiment, the solid silica is leached with hydrofluoric acid or with a mixture of hydrofluoric and hydrochloric acid.

In another embodiment, the solid silica at 5 to 20% in suspension is leached with 0.5 to 3% hydrofluoric acid.

In a further embodiment, the solid silica is leached with hydrofluoric and hydrochloric acid at a total concentration of 5 to 10%.

In a supplemental embodiment, the solid silica is leached at a temperature of 50 to 100° C.

In another embodiment, the leached solid silica is further washed with demineralized water to reduce the fluoride or chloride ions content.

BRIEF DESCRIPTION OF THE DRAWINGS

Reference will now be made to the accompanying drawings.

It will be noted that throughout the appended drawings, like features are identified by like reference numerals.

DETAILED DESCRIPTION OF THE PREFERRED EMBODIMENT

Figure 1:
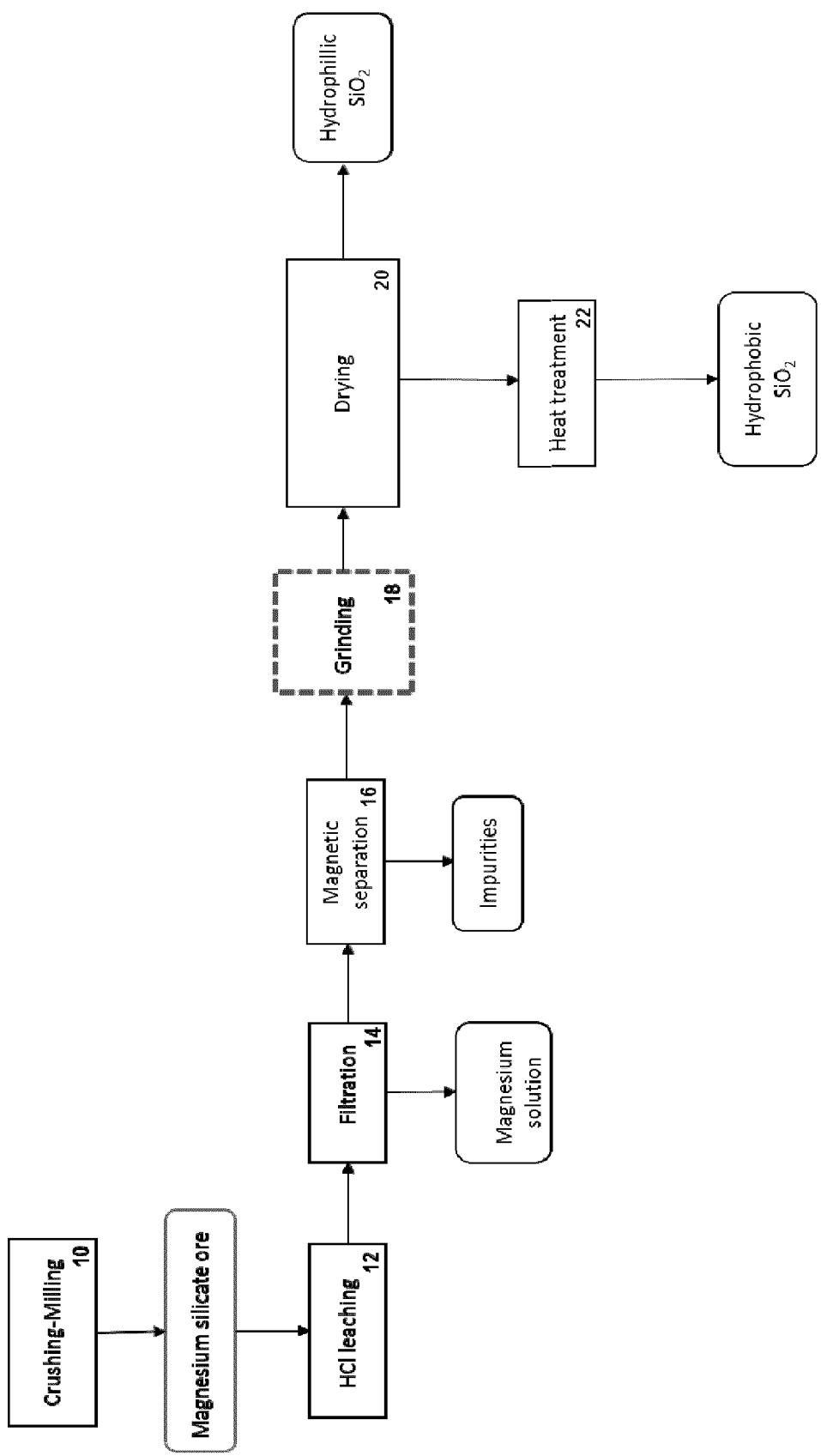
FIG. 1 illustrates a schematic representation of a process of producing amorphous silica with hydrophilic or hydrophobic surface properties from serpentine in accordance with one embodiment.

In accordance with the present disclosure, there is provided a method to make amorphous silica of a desirable specific surface area from natural resources readily available. It is thus provided a method to produce a silica with hydrophilic or hydrophobic surface properties, at high purity and with controlled size characteristics.

Accordingly, it is provided a process of producing amorphous silica from a raw material, such as serpentine, containing silica comprising the steps of mixing the raw material with a hydrochloric acid solution; leaching the raw material obtaining a slurry comprising a liquid fraction and a solid fraction containing silica and minerals; separating the liquid fraction and the solid fraction; removing the minerals from the solid fraction by magnetic separation producing a purified solid silica; drying the purified solid silica; and heating the purified solid silica to remove hydroxyl groups from the silica surface and reducing specific surface area of the resulting amorphous silica.

The term "serpentine" as used herein includes all raw magnesium silicate materials.

As encompassed herein, the grain size of serpentine should have a diameter inferior to 550 µm, preferably in the range of 45 to 425 µm. To obtain a silica of homogeneous particle size, the material can be selected based on a specific size fraction (crushing-Milling 10).

The fine serpentine is then dissolved in a hydrochloric acid solution, preferably at concentrations in the range of 4 to 7 moles per liter. Untreated water containing various elements can be used to dilute the concentrated acid. Serpentine is added to the acid solution over a period of 3 to 10 minutes. When the serpentine is added to a solution at approximately 40° C., the temperature remains unchanged. However, when the solution's initial temperature is higher, namely in the range of 50 to 80° C., an exothermic reaction occurs resulting in an overall increase of 5 to 25 degrees in temperature. The acid solution's initial temperature has no incidence on the specific surface area of the silica generated, all other leaching conditions being the same.

To obtain a high level of purity, leaching 12 should be conducted under stoichiometric ratios. This takes into consideration the quantity and the oxidation state of the soluble elements present in the crude serpentine to convert the metals into their corresponding chloride compounds. Leaching allows elements, such as magnesium, iron and nickel, to report to the aqueous media, leaving behind a solid residual silica of an amorphous structure. The total reaction time is between 90 to 180 minutes for temperatures in the range of 80 to 105° C.

The resulting slurry is afterward subjected to a separation process by any conventional method, for example by filtration 14. The chloride solution containing an appreciable amount of magnesium may be treated to recover this valuable element as well as to regenerate the hydrochloric acid. The solid portion, such as the amorphous silica, is washed with water, preferably hot, to facilitate the removal of any remaining impregnated magnesium-rich solution.

Undissolved minerals, largely magnetic in nature, are removed from the residual silica by magnetic separation 16 at low, and possibly, hight field intensities for a better yield under wet processing conditions. The recovered silica is then washed with water free of impurities, or at very low content, to preserve the real specific surface area. Any alkaline earth metals present in the water increases the level of impurities in the final product. This purification step increases the content in the silica material by approximately 1 to 5%. Under these operational parameters, silica with a specific surface area in the range of approximately 200 to 400 $m^2/g$, as measured with the BET method, is obtained. The morphology, namely surface irregularities due to pores and other imperfections, of the particles produced, affects the specific surface area. These irregularities result in a real surface area consistently superior to the ideal surface without imperfections.

If the particle size distribution exceeds the target range, the oversized amorphous silica may be grinded 18 by any wet methods known in the art. Alternatively, grinding can be performed after drying the silica.

In order to preserve the hydrophilic property of silica, the drying process 20 should be carried out under controlled conditions. The suggested temperature range is from 60 to 200° C. High temperature drying should be performed over a short time to avoid overheating the surface of the silica. Lower temperature drying enables one to achieve the humidity level required by the intended market (FIG. 1). Between 120° C. and approximately 200° C., physically adsorbed water on the particle surfaces is eliminated but the chemically-bounded water of the hydroxyl groups remains.

Furthermore, silica with hydrophobic surface properties may be obtained through a heat treatment 22 in the range of approximately 200 to 800° C. Above theses temperatures, silica undergoes a transitional stage, experiencing an amorphous to crystalline phase change. Hydroxyl groups (Si—OH) are partially or totally removed from the silica surface depending on the temperature and heating time. Silica surface hydrophobic properties improve as the hydroxyl groups are destroyed. Calcination has combined effect, such as for example a low reduction of the specific surface area, in particular between 1 to 8%, caused by new grouping (Si—O—Si).

Hydrophilic and hydrophobic silica promote different pH as a result of the groups present on their surfaces. The pH of the low temperature dried silica is in a range of 3-4 while the higher temperature calcinated silica sets the pH value between 5 and 6.

Figure 2:
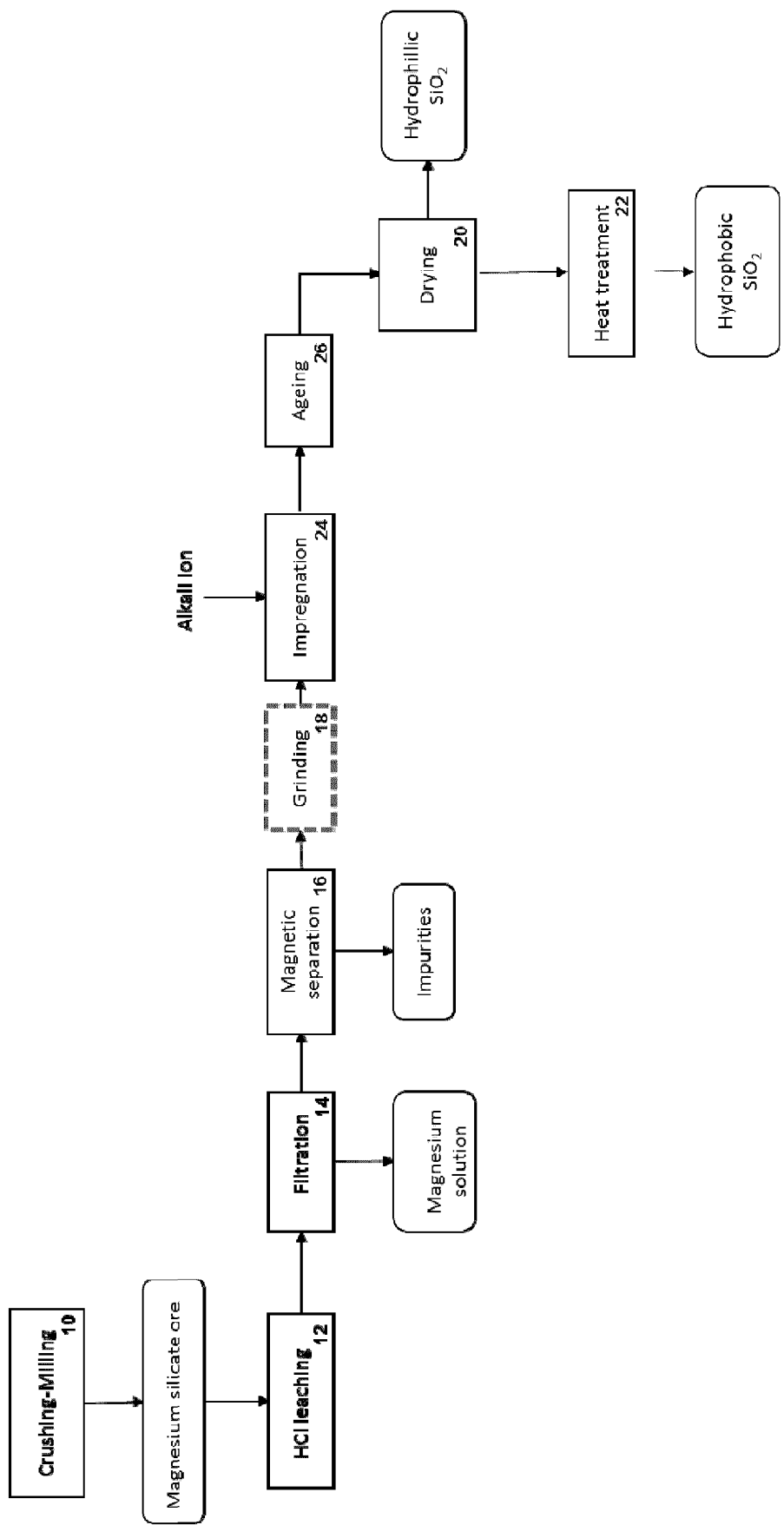
FIG. 2 illustrates a schematic representation of a process of producing amorphous silica with hydrophilic or hydrophobic surface properties from serpentine in accordance with another embodiment.

Alkali ion doping may be used to decrease the specific surface area of amorphous silica in order to produce a wide range of materials to meet the requirements of various applications (FIG. 2). Elements of the alkali group have only one valence electron. As encompassed herein, lithium, sodium, potassium and cesium are proposed. Alkali metals may be in the form of carbonate, chloride, nitrate or sulphate. A mixture of doping cations and anions forms is possible, for example, sodium carbonate and lithium nitrate can be used together. Alternatively, sodium aluminate may be used as a specific surface area decreasing agent due to the presence of the sodium metal in the compound.

Purified silica from either the magnetic or grinding treatment is doped by impregnation 24 at room temperature between 15 and 30° C. This impregnation step is, therefore, carried out without energy consumption. The required humidity in the material ranges from approximately 40 to 60%. Depending on the content of initial water, the doping alkali ion is added in aqueous or solid state. The required amount of alkali ion varies from 0.01 to 0.50 millimoles per gram of silica, calculated on a dry weight basis. To have a uniform impregnation and an optimal effect, the paste is agitated until a homogeneous mixture is achieved. The total reaction time is somewhere between 2 to 48 hours, preferably in a 6 to 36 hour window. In a humid media, during its ageing step 26, the reacting doping ions set in interstitial sites. The alkali ion modifies the specific surface area by partial or complete space filling as a result of its physical size.

Alternatively, when using alkali ions to decrease the specific surface area, a suspension containing around 5 to 25% of silica may be prepared.

The alkali element is added in a same amounts as mentioned above. The ageing time under constant stirring is in the range of approximately 20 to 240 minutes. The optimal reaction temperature is between 50 to 100° C. At the end of the ageing period, the slurry is subjected to a separation step. The residual water may be recovered for later use. Compared to the paste impregnation method, this silica suspension method requires an additional step, namely a separation action.

Figure 3:
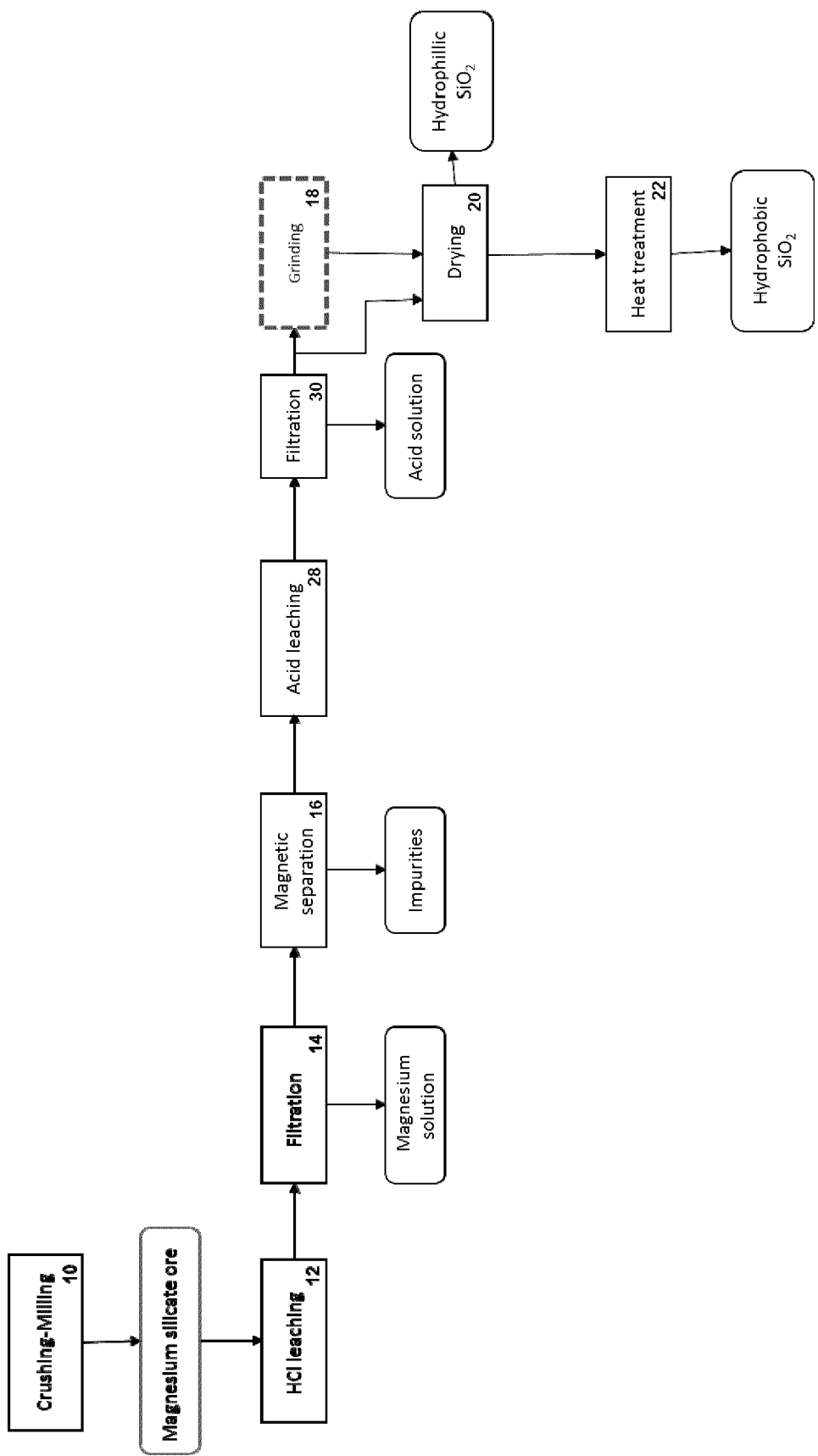
FIG. 3 illustrates a schematic representation of a process of producing amorphous silica with hydrophilic or hydrophobic surface properties from serpentine in accordance with a further embodiment.

To decrease the specific surface area while enhancing the purity of the product, a secondary leaching 28 (FIG. 3) is proposed as a replacement of the previous impregnation process. Hydrofluoric acid or a mixture of hydrofluoric (HF) and hydrochloric acid (HCl) is used. As in the original primary leach, the resulting product of this leach stage is affected by several parameters, such as liquid to solid ratio, acid concentration, temperature and reaction time, as they modify the characteristics of the silica. Specific surface area may be reduced up to 90% due to the decrease of the pore volume and the amount of interstitial sites. This acidic treatment promotes a silica structure of greater order and smoother surface as well as lower levels of impurities.

For this secondary leaching, a slurry with a silica content in the range of 5 to 20% and a HF concentration of approximately 0.5 to 3% is proposed. At higher HF concentrations, the acid solubilizes the silica and the desired effects are not obtained. However, HCl may be added until the total acid concentration reaches 5 to 10%. The combination of these acids allows the dissolution of impurities, particularly calcium and magnesium. The optimum range of temperature to leach the silica is between 50 to 100° C. for a period of time ranging from 20 to 120 minutes under constant stirring. Afterward, the mixture is subjected to a separation/filtration 30. The recovered silica is washed with demineralized water until the amount of fluoride and chloride ions is acceptable for the intended market. If necessary, silica may be grinded by wet process to reduce the particle sizes. The acid solution may be reused until its effectiveness at dissolving a specific element decreases.

Modified silica from either impregnation or secondary acid leaching steps is dried 20 under the same conditions described previously for the production of a hydrophilic silica. To obtain a silica with hydrophobic characteristics, the wet solid is subjected to a heat treatment 22 where temperature and reaction time are selected based on the presence or absence of alkali ions and the degree of hydroxyl groups to be removed. The heat treatment temperature ranges from 200 to 800° C. Doped silica is calcinated at lower temperatures than the silica obtained from the secondary HF leach in order to avoid a crystalline phase in the product. The phase transition temperature is affected by the nature and the quantity of the alkali ions used as a doping agent. Heat treatment further reduced the specific surface area but to a lesser extent, in the range of 1 to 8%.

The process described herein allows the production of amorphous silica with specific surface area, hydrophilic/hydrophobic property, purity and particle size characteristics suitable for a given application.

The natural raw materials proposed earlier are available in many locations. When serpentine residues are chosen as raw material, conventional mining is unnecessary because the residue is stored in large tailing piles readily available on the mining sites. This efficient and easily implemented novel method exhibits economic benefits mainly associated with low energy costs when compared to traditional methods of amorphous silica production. The desired product characteristics are obtained through precisely controlled operational conditions.

The present invention will be more readily understood by referring to the following examples which are given to illustrate the invention rather than to limit its scope.

Example I

Several tests were carried out with the method described herein. The following tables show the chemical composition of the serpentine used and its particle size distribution. Specific surface area measured by the BET method and pH are also shown.

TABLE 1

Chemical composition of serpentine including LOI at 1000° C.

| Chemical composition of serpentine | Content (%) |
|---|---|
| $SiO_2$ | 43.8 |
| $Al_2O_3$ | 2.09 |
| $Fe_2O_3$ | 9.57 |
| MgO | 40.6 |
| CaO | 1.21 |
| $Na_2O$ | 0.16 |
| $K_2O$ | 0.30 |
| $TiO_2$ | 0.07 |
| $P_2O_5$ | 0.03 |
| MnO | 0.13 |
| $Cr_2O_3$ | 0.43 |
| $V_2O_5$ | 0.00 |
| Sum | 98.4 |
| $S_{BET}$ (m$^2$/g) | 7.2 |
| pH, 5% slurry | 9.4 |

TABLE 2

Sieve analysis of serpentine

| um | % on sieve | % pass |
|---|---|---|
| 550 | 0 | 100 |
| 177 | 9.5 | 90.5 |
| 106 | 32.3 | 58.2 |
| 75 | 20.2 | 38.1 |
| 45 | 18.0 | 20.0 |
| Panne | 20.0 | 0.0 |

To produce amorphous silica, the serpentine was leached with hydrochloric acid at 7 moles per liter on a stoichiometric basis under constant stirring. The temperature was maintained between 90-95° C. for 2 hours. At the end of the extraction operation, the slurry was filtered and the silica washed with demineralized water. The amorphous silica was afterward dried at 100° C. to constant weight then stored for future tests and comparative results. Different properties of silica were analyzed; they are presented in the next tables.

TABLE 3

Chemical composition of silica including LOI at 1000° C.

| | Content (%) |
|---|---|
| $SiO_2$ | 84.7 |
| $Al_2O_3$ | 2.04 |
| $Fe_2O_3$ | 1.66 |
| MgO | 7.70 |
| CaO | 1.87 |
| $Na_2O$ | 0.24 |
| $K_2O$ | 0.35 |
| $TiO_2$ | 0.10 |
| $P_2O_5$ | 0.00 |
| MnO | 0.07 |
| $Cr_2O_3$ | 0.48 |
| $V_2O_5$ | 0.00 |
| $C_{Total}$ | 0.10 |
| Sum | 99.3 |
| $S_{BET}$ (m$^2$/g) | 363 |
| pH, 5% slurry | 3.7 |

TABLE 4

Sieve analysis of silica

| um | % on sieve | % pass |
|---|---|---|
| 550 | 0 | 100 |
| 177 | 8.4 | 91.6 |
| 106 | 19.4 | 72.2 |
| 75 | 13.7 | 58.5 |
| 45 | 16.0 | 42.5 |
| Panne | 42.5 | 0.0 |

From a raw material with a specific surface area of 7.2 m$^2$/g, amorphous silica of 363 m$^2$/g was obtained. Since silica was dried at low temperature to remove the humidity while conserving the hydroxyl group on the particle surface, the pH value was 3.7. The percentage of fine particles, namely under 45 µm, in the untreated concentrated silica product, is greater than the original serpentine.

The silica, obtained from the leaching step described previously, was separated into several fractions for further testing. The objective of these next tests is to promote hydrophobic properties, decrease the specific surface area and reduce the level of impurities.

Example II

The silica was subjected to heat treatments at 300 and 500° C. in a muffle furnace, for 4 hours. The specific surface area and pH measured are presented in the table below. The BET of silica was reduced by approximately 1.7% and 5.8% when heated at 300° C. and 500° C. respectively as a reference measure. Silica pH was increased from 3.7 to 5.2 after being calcined to 300° C.

TABLE 5

Specific surface area and pH of silica

| Temperature (° C.) | $S_{BET}$ (m$^2$/g) | pH (5% slurry) |
|---|---|---|
| 100 | 363 | 3.7 |
| 300 | 357 | 5.2 |
| 500 | 342 | — |

Example III

To decrease the specific surface area using alkali ions, five tests were carried out under conditions shown in the following table. Sodium carbonate ($Na_2CO_3$) and sodium aluminate ($NaAlO_2$) were used as well as demineralized water to generate a paste or a suspension. In accordance with the impregnation process, the pastes were aged at the ambient temperature of 22° C. whereas the suspensions were allowed to react at 90° C. while stirring. Upon completion, the pastes were directly introduced in the oven while the slurries were filtrated before being dried.

In the case of sodium aluminate, the aluminum was considered an anion contributing to lowering the BET surface area despite its tree valence electrons.

TABLE 6

Experimental conditions and BET surface area related results

| Sample | M+ (mmol/g SiO₂) | Paste humidity (%) | Impregnation time (h) | $S_{BET}$ 100° C. | $S_{BET}$ 200° C. |
|---|---|---|---|---|---|
| $SiO_2$ | 0 | 0 | 0 | 360 | 363 |
| Na—Al/$SiO_2$ | 0.20 | 42 | 24 | 267 | 262 |
| Na—Al/$SiO_2$ | 0.11 | 42 | 24 | 300 | 298 |
| Na/$SiO_2$ | 0.11 | 44 | 6 | — | 148 |

| Sample | M+ (mmol/g SiO₂) | Slurry solid content (%) | Ageing time (h) | $S_{BET}$ 100° C. | $S_{BET}$ 200° C. |
|---|---|---|---|---|---|
| $SiO_2$ | 0 | 0 | 0 | 360 | — |
| Na—Al/$SiO_2$ | 0.17 | 21 | 2 | 162 | — |
| Na/$SiO_2$ | 0.17 | 21 | 2 | 72 | — |

The results indicate that both doping agents used successfully reduced the specific surface area. However, sodium carbonate proved to be more efficient in both paste and slurry methods. The BET measured for silica dried at 100 and 200° C. were similar.

Example IV

Two silica samples with a solid content of 23% were leached a second time with an aqueous acid solution at 90° C. for 2 hours while stirring. For one sample, only HF was used at a concentration of 3.0%. The second sample was leached using a mixture of HF and HCl at 3.0% and 2.2% respectively, for a total acid concentration of 5.2%. The resulting leached slurries were then filtrated. Both silica samples were washed with demineralized water and dried at 200° C.

TABLE 7

Chemical composition of silica including LOI at 1000° C.

| | HF Content (%) | HF + HCl Content (%) |
|---|---|---|
| SiO2 | 88.8 | 93.8 |
| Al2O3 | 1.77 | 2.03 |
| Fe2O3 | 0.83 | 0.57 |
| MgO | 5.48 | 1.43 |
| CaO | 1.36 | 0.77 |
| Na2O | 0.27 | 0.24 |
| K2O | 0.36 | 0.31 |
| TiO2 | 0.03 | 0.02 |
| P2O5 | 0.00 | 0.00 |
| MnO | 0.04 | 0.04 |
| Cr2O3 | 0.21 | 0.39 |
| V2O5 | 0.00 | 0.00 |
| Sum | 99.1 | 99.6 |
| $S_{BET}$ (m²/g) | 38 | — |

The table above indicates that a greater silica content was achieved when leaching with the acid mixture. The impurities, particularly magnesium and calcium, were decreased significantly. The specific surface area of silica obtained by HF leaching was found to be 38 m²/g.

While the present disclosure has been described with particular reference to the illustrated embodiment, it will be understood that numerous modifications thereto will appear to those skilled in the art. Accordingly, the above description and accompanying drawings should be taken as illustrative and not in a limiting sense. It will be understood that the present disclosure is capable of further modifications and this application is intended to cover any variations, uses, or adaptations, including such departures from the present disclosure as come within known or customary practice within the art and as may be applied to the essential features hereinbefore set forth, and as follows in the scope of the appended claims.

What is claimed is:

1. A process producing amorphous silica with a desired and controlled specific surface area from serpentine comprising the steps of:
   (a) mixing serpentine with a hydrochloric acid solution;
   (b) leaching the serpentine obtaining a slurry comprising a liquid fraction and a solid fraction containing silica and minerals;
   (c) separating the liquid fraction from the solid fraction;
   (d) removing the minerals from the solid fraction by magnetic separation producing a purified solid silica;
   (e) reducing the specific surface area of the purified solid silica by impregnation with a decreasing agent;
   (f) drying the purified solid silica at a temperature of 60 to 200° C.; and
   (g) heating the purified solid silica at a temperature of 200 to 800° C. to remove hydroxyl groups from the silica surface and reducing specific surface area of the resulting purified amorphous silica, generating purified amorphous silica with the desired specific surface area.

2. The process of claim 1, wherein the grain size of serpentine comprises a diameter of less than 550 μm.

3. The process of claim 1, wherein the grain size of serpentine comprises a diameter between 45 to 425 μm.

4. The process of claim 1, wherein the serpentine is dissolved with hydrochloric acid solution at a concentration in the range of 4 to 7 moles per liter.

5. The process of claim 1, wherein the serpentine is leached at a temperature of 80 to 105° C.

6. The process of claim 1, wherein the liquid fraction is further treated to recover magnesium and recuperate the hydrochloric acid.

7. The process of claim 1, further comprising washing the solid silica with water free of impurities, increasing the content of silica by 1 to 5%.

8. The process of claim 1, wherein the decreasing agent is at least one of lithium ($Li^+$), sodium ($Na^+$), potassium ($K^+$) and cesium ($Cs^+$).

9. The process of claim 8, wherein the decreasing agent is a salt of at least one of a carbonate ($CO_3^{2-}$), a chloride ($Cl^-$), a nitrate ($NO_3^-$) and a sulphate ($SO_4^{2-}$) form.

10. The process of claim 8, wherein the purified solid silica is impregnated with at least one of $Li_2CO_3$, LiCl, $LiNO_3$, $Li_2SO_4$, $Na_2CO_3$, NaCl, $NaNO_3$, $Na_2SO_4$, $K_2CO_3$, KCl, $KNO_3$, $K_2SO_4$, $Cs_2CO_3$, CsCl, $CsNO_3$, $Cs_2SO_4$ and a mixture thereof.

11. The process of claim 1, wherein the purified solid silica is impregnated with sodium aluminate ($NaAlO_2$).

12. The process of claim 1, wherein the decreasing agent is added in aqueous or solid state.

* * * * *